Patented May 9, 1950

2,507,485

UNITED STATES PATENT OFFICE 2,507,485

PREPARATION OF N-ARYL-2,4-DIKETO-TETRAHYDROQUINOLINES

Curt G. Vogt, Union, and Charlotte G. Verdery, Phillipsburg, N. J., assignors to General Aniline & Film Corporation, New York, N. Y., a corporation of Delaware No Drawing. Application June 14, 1946, Serial No. 676,864

5 Claims. (Cl. 260—289)

This invention relates to improvements in the process of reacting acetic anhydride with N-monoaryl-o-aminobenzoic acids to form the corresponding N-aryl-2,4-diketo-tetrahydroquinolines. More particularly, it is concerned with improving the yield and purity of the product 2,4-diketo-tetrahydroquinolines.

According to the known process for the preparation of N-aryl-2,4-diketo-tetrahydroquinolines, German Patent 287,803, acetic anhydride is heated with the corresponding N-monoaryl-o-aminobenzoic acid, the reaction mass then dissolved in dilute sodium hydroxide, and the product precipitated by acidification of the alkali solution.

We have now found that when the reaction for the preparation of N-aryl-2,4-diketo-tetrahydroquinolines from acetic anhydride and the corresponding N-monoaryl-o-aminobenzoic acids is conducted in the presence of added glacial acetic acid, increase in the yield and purity of the product are obtained.

The amount of the added glacial acetic acid in the reaction mixture can be varied rather widely, ranging in weight ratio from as low as 1:10 to as high as 20:1, preferably within the weight ratio range of from about 1:2 to about 5:1, on the N-monoaryl-o-aminobenzoic acid employed.

The acetic anhydride and the N-monoaryl-o-aminobenzoic acid may be employed in theoretical reacting proportions, i. e., in the mol ratio of 2 to 1 respectively. However, in order to promote the maximum possible yields of the product, the reaction is preferably conducted with the acetic anhydride in excess of the theoretical reacting proportion, for which a preferred mol ratio is from about 2.5:1 to about 5:1 respectively. The N-monoaryl-o-aminobenzoic acid is contained in solution or suspension in the diluent glacial acetic acid and the acetic anhydride may be added portionwise or all at once thereto.

The reaction may be conducted at temperatures within the range of from about 60° C. to about 120° C., preferably within the range of about 70° C. to about 100° C.

The N-aryl-2,4-diketo-tetrahydroquinoline is isolated in the known manner by dissolving the reaction mass in dilute sodium hydroxide, followed by acidification of the solution to precipitate the product. In dissolving the reaction mass, the mixture is agitated at an elevated temperature of about 90° C. until the product is completely dissolved, and preferably only sufficient of the alkali is employed as will keep the solution strongly alkaline, as an excess tends to precipitate the product. The solution is filtered to remove any residue and cooled to at least 40° C. before addition of the acid, as acidification carried out in the hot solution will bring the product down in a gummy form. After the acidification, the mixture is heated to decompose any sodium salt which is formed, e. g., to about 75° C., at the same time increasing the particle size of the product, which improves the rate of filtration thereof.

Prior to the isolation of the product the greater part of the acetic acid in the reaction mass may be removed by distillation under reduced pressure. In this way, the requirement of sodium hydroxide for dissolving of the reaction mass may be reduced. The recovered glacial acetic acid, accompanied by a smaller quantity of the acetic anhydride, may be re-used in the process.

The invention is further illustrated by the following specific example to which it is not intended that it be limited. Parts are by weight.

Example 416 parts of acetic anhydride is added in dropwise manner to a mixture of 243 parts of N-(2'-methoxyphenyl)-anthranilic acid and 525 parts of glacial acetic acid, heated to and maintained at 80° C. under agitation for 7 hours after which the reaction mass is allowed to cool. The reaction vessel is equipped for distillation under reduced pressure and the greater portion of the acetic acid along with some acetic anhydride is distilled off (fraction boiling up to 50° C. at 22 mm.). The reaction mass of reduced acetic acid content is slowly poured into a vigorously stirred relatively large volume of dilute aqueous sodium hydroxide, calculated to bring the resulting solution to the slightly alkaline condition. A further quantity of the dilute aqueous sodium hydroxide is added, sufficient to make the solution of the product strongly alkaline to phenolphthalein, and the mixture agitated at about 90° C. until the product is completely dissolved. The solution is filtered. To the filtrate, cooled to at least 40° C., is added concentrated hydrochloric acid until the solution is strongly acid to Congo paper. The mixture is heated to 75° C., cooled to at least 40° C. and filtered. The filter cake is washed neutral with cold water and the product dried at 80° C. There is thus obtained 240 parts of reaction product having a coupling value of 66 per cent which corresponds to a yield of 158 parts of N-(2'-methoxyphenyl)-2,4-diketo-tetrahydroquinoline. The preparation was carried out by identical procedure but without the addition of acetic acid as diluent. The purity and yield of the product were lower, the yield being 10.5% less.

The improved process finds particular value in the preparation from N-(2'-methoxyphenyl)-anthranilic acid and acetic anhydride of N-(2'-methoxyphenyl)-2,4-diketo-tetrahydroquinoline which is a valuable coupling compound in the manufacture of azo dyes. It is not limited thereto, however, but can be applied to advantage in yield and purity of product employing as starting materials other N-monoaryl-o-aminobenzoic acids capable of condensation and ring closure with acetic anhydride to form the corresponding N-aryl-2,4-diketo-tetrahydroquinolines. Among other suitable N-monoaryl-o-aminobenzoic acids may be mentioned, for example, those in which the aryl radical on the N atom is of the benzene or naphthalene series and is unsubstituted or contains a monovalent substituent which may be an alkyl, cycloalkyl, alkoxy, aryl or an aryloxy group, such as the methyl, ethyl, isopropyl, butyl, hexyl, cyclohexyl, methylcyclohexyl, methoxy, ethoxy, propoxy, phenyl and phenoxy groups, or a halogen atom, preferably chlorine or bromine, or an amino, hydroxy, carboxy or nitro group, which may be present as sole substituents or in combinations thereof.

Since various other embodiments of the invention will occur to those skilled in the art, it is not intended that the scope of the patent be limited except as is required by the prior art and the appended claims.

We claim:

1. In the process of preparing an N-aryl-2,4-diketo-tetrahydroquinoline by heating the corresponding N-monoaryl-o-aminobenzoic acid with acetic anhydride, the improvement which comprises conducting the reaction in the presence of a proportion of added glacial acetic acid corresponding to a weight ratio of from about 1:10 to 20:1 based on the N-monoaryl-o-aminobenzoic acid.

2. In the process of preparing an N-aryl-2,4-diketo-tetrahydroquinoline by heating an N-monoaryl-o-aminobenzoic acid with acetic anhydride, the improvement which comprises conducting the reaction in the presence of a proportion of added glacial acetic acid corresponding to a weight ratio of from about 1:2 to 5:1 on the N-monoaryl-o-aminobenzoic acid.

3. A process of preparing an N-alkoxyphenyl-2,4-diketo-tetrahydroquinoline which comprises heating the corresponding N-alkoxyphenyl-o-aminobenzoic acid with an excess of acetic anhydride over the theoretical reacting proportion thereof, in the presence of a proportion of added glacial acetic acid corresponding to a weight ratio of from about 1:2 to 5:1 on the N-alkoxyphenyl-o-aminobenzoic acid.

4. A process of preparing an N-methoxyphenyl-2,4-diketo-tetrahydroquinoline which comprises heating the corresponding N-methoxyphenylanthranilic acid with an excess of acetic anhydride over the theoretical reacting proportion thereof, in the presence of a proportion of added glacial acetic acid corresponding to a weight ratio of from about 1:2 to 5:1 on the N-methoxyphenylanthranilic acid.

5. A process of preparing N-(2'-methoxyphenyl)-2,4-diketo-tetrahydroquinoline which comprises heating N-(2'-methoxyphenyl)-anthranilic acid with an excess of acetic anhydride over the theoretical reacting proportion thereof, in the presence of a proportion of added glacial acetic acid corresponding to a weight ratio of from about 1:2 to 5:1 on the N-(2'-methoxyphenyl)anthranilic acid.

CURT G. VOGT.
CHARLOTTE G. VERDERY.

REFERENCES CITED

The following references are of record in the file of this patent:

FOREIGN PATENTS

| Number | Country | Date |
| --- | --- | --- |
| 284,291 | Germany | May 19, 1915 |
| 287,803 | Germany | Oct. 5, 1915 |